(12) United States Patent
Kubinski et al.

(10) Patent No.: US 6,524,416 B1
(45) Date of Patent: Feb. 25, 2003

(54) STRESS NEUTRALIZATION OF AN APEX FILLER FOR A TIRE BEAD SUBASSEMBLY

(75) Inventors: Donald Chester Kubinski, Medina, OH (US); Michael Wallace Smith, Mogodore, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/762,547

(22) PCT Filed: Oct. 20, 1998

(86) PCT No.: PCT/US98/22547

§ 371 (c)(1),
(2), (4) Date: Feb. 8, 2001

(87) PCT Pub. No.: WO00/23262

PCT Pub. Date: Apr. 27, 2000

(51) Int. Cl.$^7$ ............................................. B29D 30/48
(52) U.S. Cl. ..................... 156/136; 156/131; 156/398; 156/422
(58) Field of Search ................. 156/131, 135, 156/136, 398, 422, 406.4, 130.7, 413; 425/319, 322, 391; 264/281, 209.3, DIG. 40; 152/541

(56) References Cited

U.S. PATENT DOCUMENTS

| | | |
|---|---|---|
| 2,450,324 A | 9/1948 | Wilson et al. |
| 2,459,721 A | 1/1949 | Poltorak |
| 3,584,528 A | 6/1971 | Leblond et al. |
| 3,848,501 A | 11/1974 | Kuts |
| 4,120,929 A * | 10/1978 | Reum ........................ 264/281 |
| 5,114,512 A * | 5/1992 | Holroyd et al. ............. 156/135 |
| 5,203,938 A | 4/1993 | Moody et al. |

FOREIGN PATENT DOCUMENTS

| | | |
|---|---|---|
| DE | 28 03 460 | 2/1979 |
| DE | 31 08 142 | 9/1982 |
| GB | 314600 | 7/1929 |
| JP | 6-328543 A * | 11/1994 |
| JP | 8-118515 A * | 5/1996 |
| JP | 11-105155 A * | 4/1999 |

* cited by examiner

Primary Examiner—Geoffrey L. Knable
(74) Attorney, Agent, or Firm—Howard M. Cohn

(57) ABSTRACT

A method and apparatus are provided for a sub forming an elastomeric extrusion into a bead apex filler and for applying the same to an annular bead (120) to form a bead/apex subassembly for use in the construction of a pneumatic tire. The apex filler (100) is formed from a triangular shaped extrusion (8) that is initially wrapped around a rotating mandrel (40) having a diameter of between about 50% to about 75% of the outer diameter of the annular bead to which the filler is attached. A helical former (50, 60) disposed around the mandrel causes the extrusion to move in a helical path as it traverses the mandrel. As the extrusion is removed from the mandrel, the extrusion is sufficiently uncoiled to relieve and compressive or tensile stresses. Then, the partially uncoiled extrusion is wrapped around the outer periphery of the bead to form a bead/apex filler subassembly (118) which is substantially without compressive or tensile stresses when mounted onto the tire being constructed.

12 Claims, 4 Drawing Sheets

STRESS NEUTRALIZATION OF AN APEX FILLER FOR A TIRE BEAD SUBASSEMBLY

TECHNICAL FIELD

This invention relates to the method of producing a pneumatic tire having an apex filler, the method and apparatus for producing a bead and apex filler subassembly, and the tire produced using the bead/apex filler subassembly for use in a pneumatic tire. More particularly, the apex filler is produced from an extruded strip of elastomeric material, which is then reformed after extrusion so as to reduce the stress build-up in the apex filler caused by wrapping the filler around an annular bead.

BACKGROUND OF THE INVENTION

A pneumatic tire is composed of a tread, a belt structure, and a carcass comprising one or more plies of fabric cords coated with an elastomer. The tire contains axially spaced beads which define the innermost diameter of the tire, each bead comprising a metallic, annular ring, coated with an elastomer, adapted to contact and engage one rim of a wheel. Each bead may be combined with other elements such as flippers, chippers, apex fillers, toe guards and chaffers, all of which serve specific functions in the construction and/or the performance of the tire. This combination of the annular bead and the apex filler serves the purpose of providing a smooth transition between the bead and the adjacent sidewall of the tire. Often, the bead and apex filler are formed as a subassembly around which the carcass ply or plies are wrapped.

One prior art method of fabricating the combined bead and apex filler subassembly involves applying a flat strip of an elastomer along the inner circumference of the bead, and then encapsulating the bead by wrapping the elastomer strip around the bead. The portion of the elastomer strip which extends radially outwardly from the bead serves as the apex filler. This procedure has inherent difficulties, particularly in splicing the abutting ends of the wrapped strip. When the elastomer strip is wrapped around the bead, the outer circumference of the elastomer strip must be stretched to accommodate the difference in the circumferential dimension of the inner periphery of the strip, which is disposed about and abutted against the bead, and the outer periphery of the strip. This stretching induces stresses which can produce warping of the radial outer portion of the apex filler due to the elastic memory of the filler. The degree of warping from one apex filler to the next is not easily controllable, and this factor adversely impacts the consistency of the tire building operation and the uniformity of the resultant tires.

Another method for making the bead/filler sub-assembly is to apply the apex filler to a rotating bead for approximately one revolution after which the apex filler is cut and the two ends are gripped and stretched to splice them together. In like manner as before, this stretching causes the radially outermost edge of the filler to be elongated more than the inner portion, thus leading to warpage and/or cupping of the filler with the outer edge curling radially inwardly and axially away from the bead.

Yet another method is described in U.S. Pat. No. 5,203,938. This patent describes the use of a chuck assembly with a pair of powered, adjustable rollers which engage the two sides of an elastomeric filler as it exits an extruder. The rollers serve to apply a variable speed to the filler, with a first, slower speed being applied to the base of the filler, and a second, faster speed applied to the top as the strip is rotated into an annular shape corresponding to the outer periphery of the bead. The differential speed serves to minimize distortion of the filler. The operation can be used to apply the apex filler directly to a bead positioned in a chuck.

Another procedure is to lay up the tire carcass plies on a tire building mandrel, set the annular beads at the shoulders on either side of the mandrel, place an extruded apex filler around the mandrel at each side thereof, and wrap the ends of the green carcass plies around the beads and the fillers. The sidewall, tread and breakers are wrapped around the green carcass after which the green carcass is placed in a mold and is formed under heat and pressure into a toroidal shape and is cured. In the shaping and curing process, the apex fillers are rotated 90° from a flat position on the mandrel to a vertical, radial position. This method of tire construction can cause air to become trapped between the apex filler, the bead, the carcass plies and the turn-up, thereby leading to the formation of blisters in the tire sidewall and the premature failure of the tire. Furthermore, the turning of the apex filler around the curved sidewall of the tire causes the base of the filler to push compressively against the bead and the top of the apex filler to stretch to a larger diameter, thereby causing it to be in tension which leads to possible distortion and irregularities in the tire construction previously described.

OBJECTS AND SUMMARY OF THE INVENTION

It is an object of the present invention to provide a method and apparatus to pre-assemble a bead and apex filler for a tire as defined in one or more of the appended claims and, as such, having the capability of being constructed to accomplish one or more of the following subsidiary objects.

It is a further object of the present invention to permit the pre-assembly of a bead and an apex filler, with the apex filler in a stress neutralized state.

Another object of the present invention is to construct a subassembly of a bead and an apex filler wherein the apex filler is initially prestressed on a mandrel as it leaves the extruder and after which the stresses within the apex filler are at least partially neutralized as the filler is placed around the outer periphery of the bead.

Another object of the present invention is to increase the uniformity in the bead/apex filler subassembly step of the tire building process and in the pneumatic tires themselves.

These and other objects and advantages, which will become readily apparent from the following disclosure, are achieved in the construction of a pneumatic tire as hereinafter described.

In accordance with the present invention, a method is described for producing a pneumatic tire which comprises a tire carcass with a pair of annular beads adapted to engage the rims of a wheel. The carcass comprises one or more flexible plies having side edges wrapped around the beads and forming turn-ups terminating radially above the beads, and a pair of sidewalls. An apex filler is in contact with the outer periphery of each bead and extends radially outwardly therefrom between the carcass ply and the turn-up. The apex filler has a generally triangular cross-section comprising a base in contact with the bead and a pair of sides converging to form an apex radially above the base. The improvement of the present invention involves forming the apex filler by extrusion and immediately thereafter coiling the extrusion into a spiral of smaller inner diameter than the outer diameter of the peripheral surface of the annular bead. This coiling of the extrusion causes the base of the extrusion to be compressed and the peak of the extrusion to be stretched while maintaining the triangular cross-sectional shape of the extrusion. The inner diameter of the extrusion is between about 50% and about 75%, and preferably between about 50% and about 60% of the outer diameter of the annular bead. The coiled extrusion is then cooled while on a mandrel to maintain the coiled shape after which the extrusion is wrapped around the outer periphery of the annular bead to form the apex filler/annular bead subassembly.

The present invention further involves a method of producing an apex filler comprising extruding an elastomeric compound through a die to form an extrusion having the cross section of a triangle with a base and a pair of sides converging toward a peak. The method comprises forming the extruded elastomeric compound into a spiral configuration immediately following extrusion. The result is that the base of the extrusion is subject to compression and the peak of the extrusion is subject to tension while maintaining the triangular cross-sectional shape of the extrusion. The extrusion is formed into a spiral by wrapping it around a rotating mandrel. The diameter of the mandrel is between about 50% and about 75%, and more preferably between about 50% about 60% of the outer diameter of the annular bead. The extrusion is maintained in its triangular, extruded shape while being wrapped around into a spiral coiled shape on the rotating mandrel. The coiled shape is maintained by cooling or heating the extrusion while on the rotating mandrel. The extrusion is then transferred to the outer periphery of the bead to form the apex filler/annular bead subassembly.

The invention also encompasses an apparatus for use in relieving the stresses in a triangular elastomeric extrusion having a base and a pair of sides converging toward a peak. The extrusion is adapted to be used as an apex filler for making an apex filler/annular bead subassembly for a pneumatic tire. The apparatus comprises a mandrel having a diameter between about 50% and about 75% of the outer diameter of the annular bead, means to rotate the mandrel, means for changing the temperature of the mandrel to heat or to cool the extrusion wrapped therearound, and means for moving the extrusion in an axial direction along the mandrel as the mandrel rotates. The mandrel includes a helical former radially surrounding the cylindrical surface of the mandrel. The purpose of the helical former is to maintain the triangular cross-sectional shape of the extrusion as it is transformed from a linear extrudate into a spiral helix having a base in compression and a peak in tension. The helical former comprises an axially inverted, V-shaped opening corresponding to the cross sectional shape of the extrusion. The interior surface of the former comprises a low friction surface such as Teflon, or is coated with a low friction coating. As an alternative, the helical former may comprise a plurality of rollers along both sides of the helical pathway. The rollers are aligned in the plane transverse to the axis of the mandrel with the rollers in one row inclined toward the rollers in the other row to form the inverted V-shaped opening corresponding in shape and size to the cross-sectional shape of the extrusion.

The invention also includes a combination of a bead and an apex filler, made according to the process as herein described, for use in a pneumatic tire. The apex filler has a generally triangular cross section comprising a base and a pair of sides extending radially outward from the base and converging to form a peak. The base of the apex filler is in contact with the outer periphery of the annular bead, and the sides of the filler extend radially outward therefrom. The combined bead and filler are produced by forming an extrusion and then immediately thereafter coiling the extrusion into a spiral having an inner diameter between about 50% to about 75%, and preferably between about 50% to about 60% of the outer diameter of the annular bead. The coiling subjects the base of the extrusion to compression and the peak of the extrusion to stretching while maintaining the triangular cross-sectional shape of the extrusion. The extrusion is then wrapped around the outer periphery of the annular bead to form an apex filler/annular bead subassembly. Preferably, the coiled extrusion is cooled on the mandrel before being wrapped around the annular bead.

BRIEF DESCRIPTION OF THE DRAWINGS

Reference will be made in detail to preferred embodiments of the invention, examples of which are illustrated in the accompanying drawings. The drawings are intended to be illustrative, not limiting.

Certain elements in selected ones of the drawings may be illustrated not-to-scale, for illustrative clarity.

The cross-sectional views presented herein may be in the form of "slices", or "near-sighted" cross-sectional views, omitting certain background lines which would otherwise be visible in a true cross-sectional view, for illustrative clarity.

Figure 1:
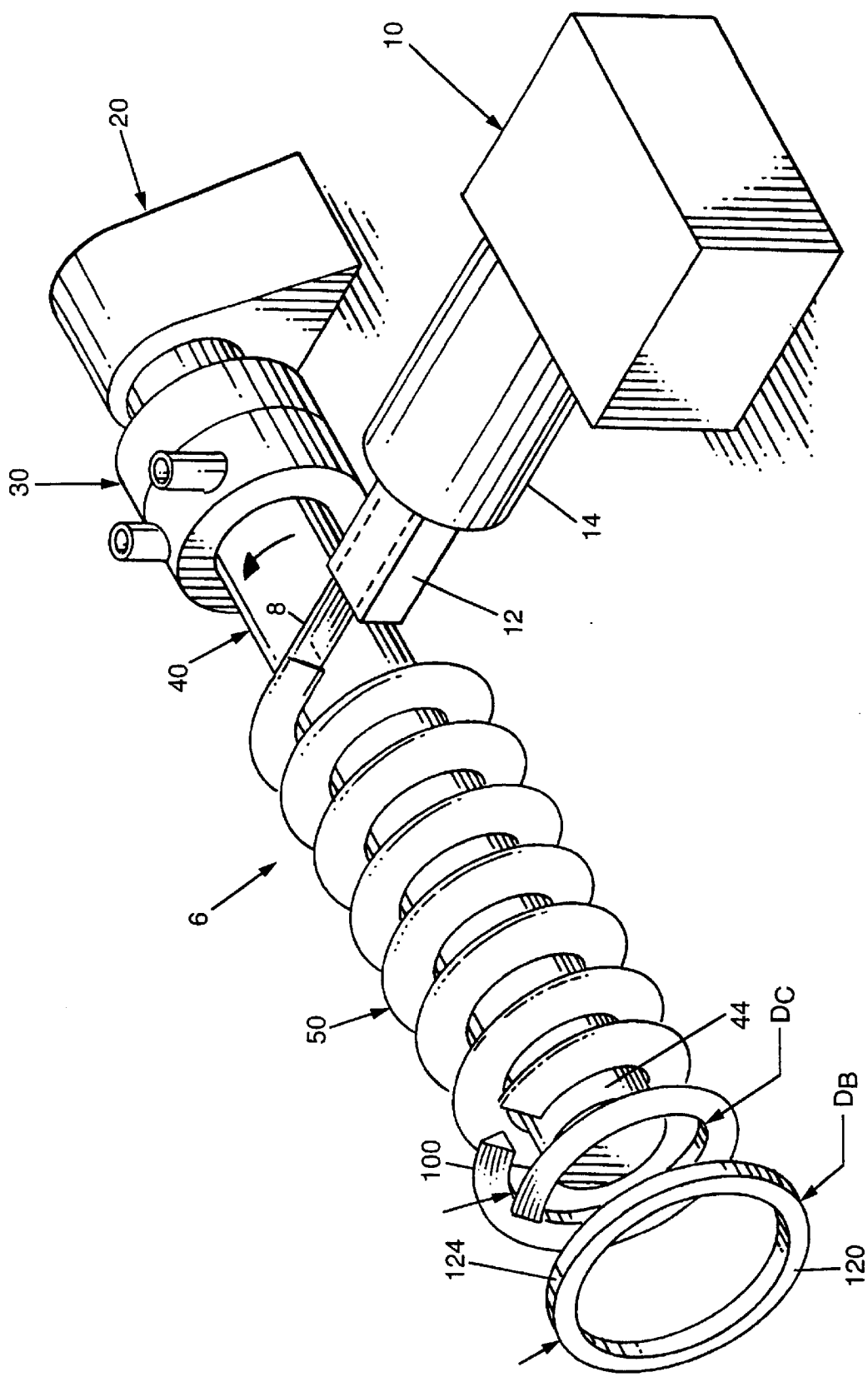
Figure 2:
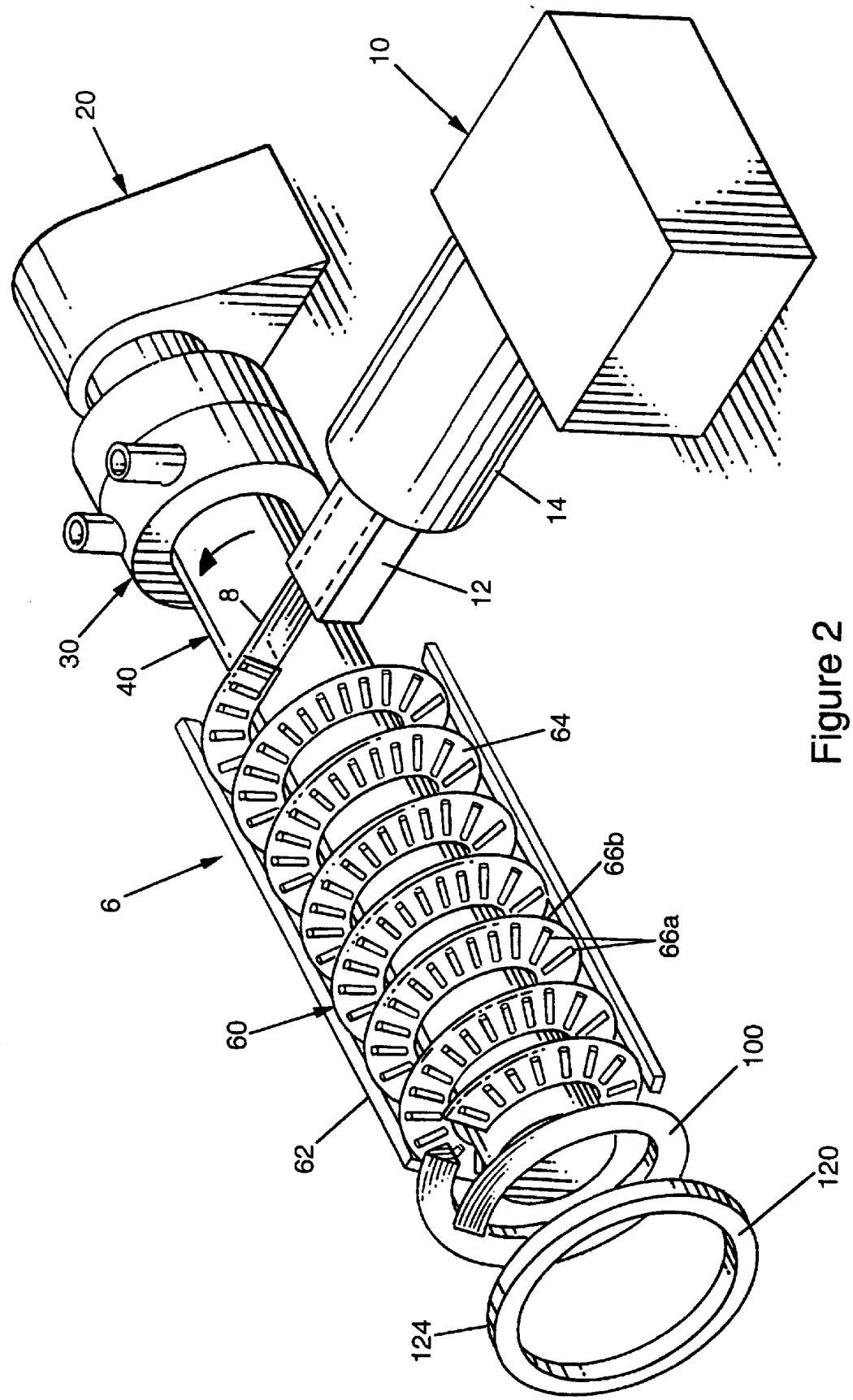
Figure 3:
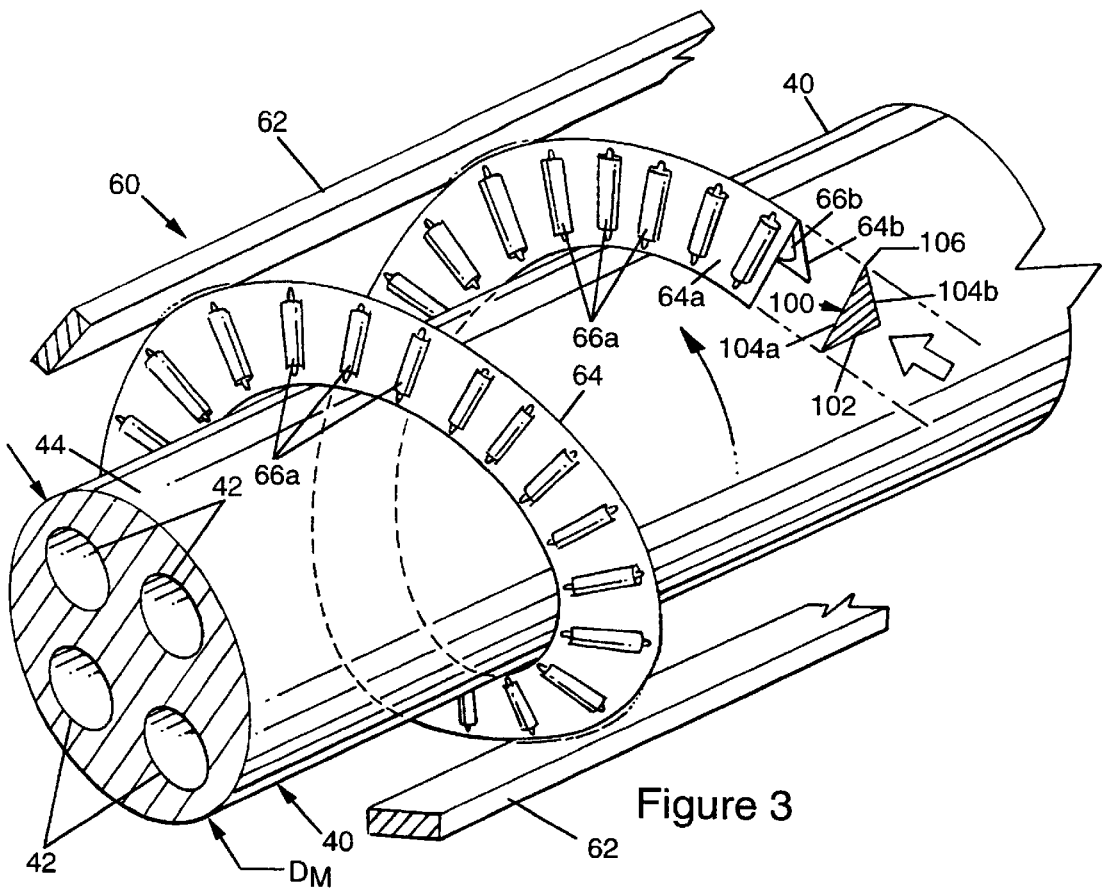
Figure 4:
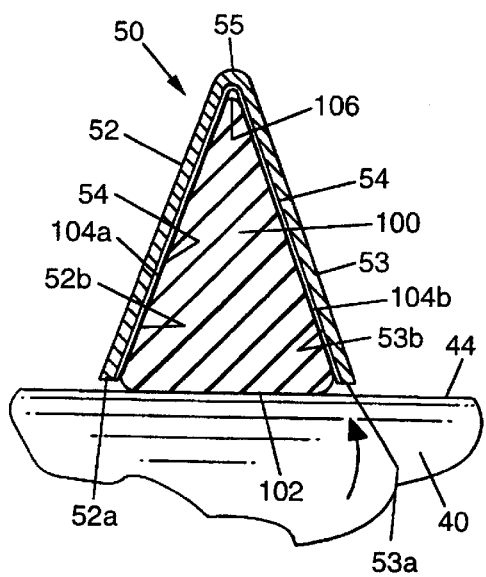
Figure 5:
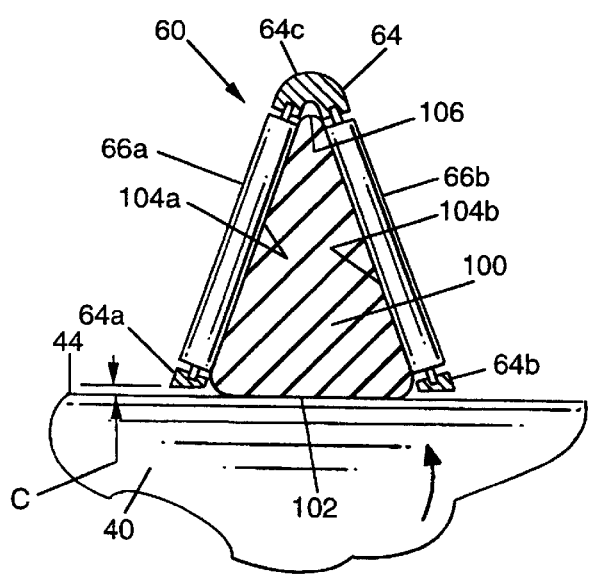
Figure 6:
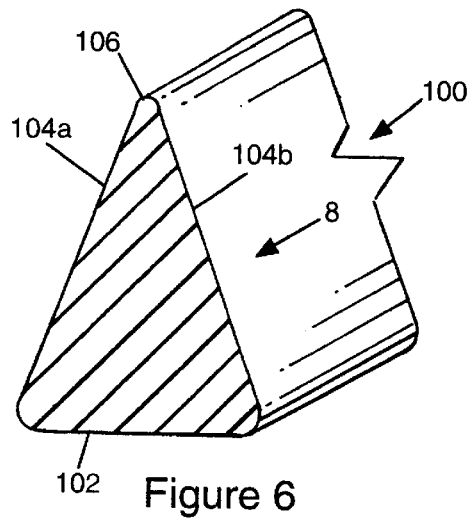
Figure 7:
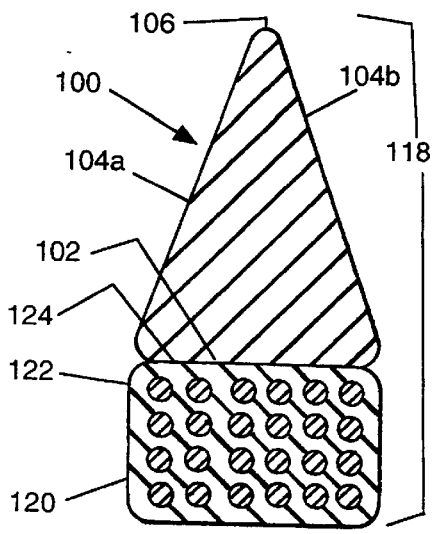

The structure, operation, and advantages of the present preferred embodiment of the invention will become further apparent upon consideration of the following description taken in conjunction with the accompanying drawings, wherein:

FIG. 1 is a perspective view of a first embodiment of an extruder and a rotating mandrel showing an elastomeric extrusion being coiled around the mandrel in a helical former in accordance with the present invention;

FIG. 2 is a perspective view of a second embodiment of an extruder and the mandrel with the elastomeric extrusion being coiled therearound in a variation of the helical former from that shown in FIG. 1;

FIG. 3 is an enlarged view, partially in cross-section, of the helical former of the second embodiment shown in FIG. 2;

FIG. 4 is a cross-sectional view of the helical former shown in the first embodiment of FIG. 1;

FIG. 5 is a cross-sectional view of the helical former of the second embodiment shown in FIG. 2;

FIG. 6 is a perspective view of a strip of apex filler;

FIG. 7 is a cross sectional view of the bead/apex filler subassembly; and

Figure 8:
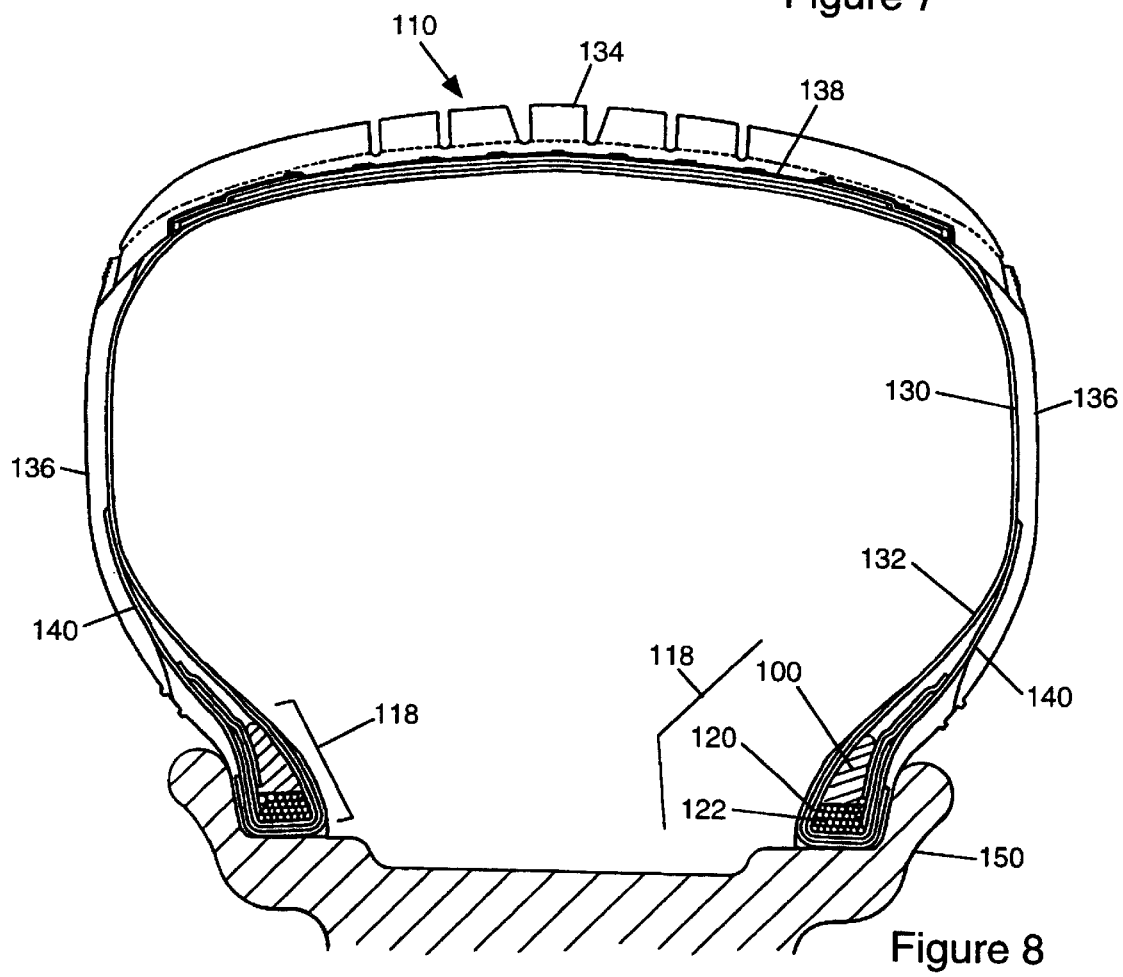

FIG. 8 is a cross-sectional view of a pneumatic tire incorporating the bead/apex filler subassembly constructed in accordance with the principles set forth in the present invention.

DEFINITIONS

"Apex filler" means a generally triangular-shaped elastomeric filler which cooperates with a bead to ensure a smooth transition between the bead and the sidewall portion of a tire.

"Axial" and "axially" means the lines or directions that are parallel to the axis of rotation of a tire.

"Bead" means the part of the tire comprising an annular tensile member associated with holding the tire on the wheel rim.

"Carcass" means the tire apart from the tread and belts, and including the beads.

"Reinforcing belt" means at least two plies of parallel cords underlying the tread having cord angles which are nearly parallel with respect to the equatorial plane of the tire.

"Sidewall" means the portion of the tire between the tread and the bead.

"Tread" means the portion of the tire radially outside of the carcass in rolling contact with the surface of a road.

DETAILED DESCRIPTION OF THE INVENTION

First Embodiment

Referring now to the drawings, FIG. 1 shows a first embodiment of a coiling apparatus 6 useful for stress neutralization of a strip 8 of an elastomeric extrusion as it leaves the die 12 of an extruder 10. The extruder 10 is of conventional design comprising an extrusion die 12 and extrusion barrel 14, and is typically used to produce continuous elastomer strips of pre-determined cross-section. These strips are cut to length and are used for treads, sidewall inserts, apex fillers, shoulder fillers and the like in the construction of the pneumatic tire. The apex filler 100, as shown in FIG. 6, is generally formed as a strip 8 with a triangular cross-sectional shape. Preferably, the triangular cross-sectional shape of the apex filler 100 is that of an isosceles triangle, having a base 102 corresponding in width to the axial width of the outer periphery of a bead and two sides 104a, 104b of equal length which converge to form the peak 106 of the triangle. The length of the sides 104a, 104b typically are about 2 to 4 times the width of the base 102.

The extruded strip 8 is transferred immediately from the extruder 10 to a rotating, temperature regulated mandrel 40 cantilevered from and driven by a motor 20. At this stage, the extruded strip 8 is coiled into the shape of an apex filler 100. The temperature regulator operates typically with a coolant such as water and/or air that both enter the mandrel 40 through a fixed manifold 30 and is circulated through passages 42 (shown in FIG. 3) that extend the length of the mandrel. Further, an air coolant is blown across the surface of the mandrel. Typically, the cooling water flows up and down the mandrel through passages 42. The mandrel 40 is driven at a rotational speed corresponding to the linear speed of the extruder 10. The surface 44 of the mandrel 40 is provided with a smooth finish to permit the elastomeric extrusion 8 to slide along the surface in the axial direction of the axis 68 extending through the mandrel as the mandrel is rotated.

Radially surrounding the cooling mandrel 40 is a stationary, helical-shaped, apex former 50, as shown in FIG. 1, which has an inner profile conforming to the cross-sectional shape of the extrusion 8. As seen in more detail in FIG. 4, the apex former 50 has sidewalls 52,53, which converge and meet at peak 55 to form the shape of an axially inverted V disposed with free ends 52a,53a adjacent surface 44 of mandrel 40. The inner surface formed by inner surface 52b,53b of sidewalls 52,53, respectively, and surface 44 of mandrel 40 forms an opening 54 corresponding to the cross sectional shape and size of the apex filler 100. The inside surface of sidewalls 52,53 of the apex former 50 preferably is coated or lined with a nonstick layer of material such as Teflon or silicone which permits the extrusion 8 to be continuously fed through the apex former as the extrusion is deposited from the extruder 10 onto the surface 44 of the rotating mandrel 40.

The outer diameter $D_M$ of the mandrel 40 is between about 50% and about 75%, preferably between about 50% and about 60% of the diameter $D_B$ of the outer peripheral surface 124 of the bead 120 on which the apex filler 100 is to be wrapped. As the extrusion 8 is wrapped around the mandrel 40, it is converted from linear movement from die 12 to apex former 50 to helical movement on the pathway provided by surface 44 of mandrel 40 through opening 54 of apex former 50 corresponding to the profile of apex filler 100, i.e. with a triangular cross-sectional shape with a base 102 and a pair of sidewalls 104a,104b converging at a peak 106. That is, the elastomeric strip 8 is coiled into a spiral shaped coil having a triangular cross-sectional shape with an inner diameter ($D_c$) being smaller than the outer diameter $D_B$ of the annular bead 120 whereby the base of the extrusion 8 is compressed and the peak of the extrusion is stretched. The resulting relatively circular movement subjects the base of the extrusion to compressive stress and the peak of the extrusion to tensile stress. As the extrusion 8 progresses along the helical path against the cooled mandrel 40, the extrusion is gradually cooled from the extrusion temperature of approximately 110° C. to about 120° C. at which it is tacky and unable to maintain its own shape, to a lower temperature of approximately 32.2° C. to about 35° C. at which it retains its cross-sectional shape and coiled diameter. As the coiled apex filler 100 leaves the mandrel 40, it starts to uncoil or unwind so that the diameter of the apex filler increases to at least partially relieve compressive and tensile stresses in the extrusion. The apex filler 100 is wrapped around the outer peripheral surface 124 of annular bead 120 to form the apex filler/annular bead subassembly 118 shown in FIG. 7. The apex filler 100 is cut to length and the two ends thereof are abutted and stitched together on the annular bead 120 (not shown).

Second Embodiment

FIGS. 2, 3, and 5 show an alternative embodiment of a coiling apparatus for maintaining the shape of the extrusion 8 as it is coiled around rotating mandrel 40. Instead of using an inverted helical-shaped apex former 50 to maintain the shape of the extrusion 8 as it is coiled, a plurality of pairs of spaced rollers 66a, 66b are provided along the helical path through which the extrusion moves. As in the first embodiment, coiling apparatus 6 comprises a manifold 30 and a cooling mandrel 40 rotatably driven by motor 20. An extruder 10 feeds a continuous elastomeric strip 8 to the mandrel 40 where it is fed between two rows of closely spaced rollers 66a, 66b forming the converging sides of the apex former 60. The strip 8 is carried along the rotating mandrel 40 and is supported by the rollers 66a, 66b as it is formed into the coiled shape of the apex filler 100. The apex filler 100 is substantially identical to that formed with the first embodiment and includes a base 102 and a pair of sides 104a, 104b converging from the base to a peak 106. Each of the rollers 66a, 66b is mounted in the helix-shaped support 64 of the apex former 60 which is secured to a stationary frame 62. The helical-shaped support has two sidewalls 64a,64b which meet at a peak 64c and are disposed at an angle corresponding to the angle between sides 104a and 104b of apex filler 100. The pairs of rollers 66a, 66b are aligned in two rows, one in the sidewall 64a and the other in sidewall 64b of helical-shaped support 64 so that the rollers in one row are inclined toward the rollers in the other row to form the inverted V corresponding in shape and size to the cross-sectional shape of the extrusion 8. The stationary frame 62, helix-shaped support 64, and rollers 66a, 66b extend along the longitudinal axis 68 through mandrel 40. As with the inner surface of the sidewalls 52,53 of apex form 50 shown in FIG. 4, rollers suitable for use in apex former 60 may be made from, or lined with a sleeve of a suitable nonstick material such as Teflon. Alternatively, polished stainless steel or other smooth surface metals may be used as the non-stick rollers. As the coiled extrusion 8 is removed from the mandrel 40, the extrusion is transferred to an annular bead 120, in the coiled state, where it is wrapped around the outer peripheral surface 124 thereof to form the annular bead/apex filler subassembly 118. Then the extrusion is cut so that the two ends of the filler abut one another and stick because of their tackiness. The apex bead filler subassembly 118 is partially uncoiled as it is wrapped around the bead 120, thereby helping to relieve the stresses within the filler.

The helix around the mandrel 40 has a pitch of between about 5 centimeters (cm) and about 10 cm, and preferably between about 5 cm and 6.5 cm. The clearance "c" as shown in FIG. 5, between the mandrel 40 and helix form support 64 allows for free rotation of the mandrel and for passage of the extrusion 8 around the mandrel along the helical path. However, the clearance "c" is not great enough to permit any of the extrusion 8 to be squeezed through the clearance "c" between the form support 64 and the mandrel 40. A radial clearance "c" of between about 0.3 cm and about 0.65 cm is acceptable.

A completed apex/bead filler subassembly is shown in FIG. 7. The bead 120 typically comprises multiple strands of bead wire 122 composed of a single or monofilament steel wire coated with an elastomer and repeatedly wrapped to form the completed bead 120. The coiled apex filler 100 may be wrapped around the bead 120 either by hand or by use of suitable equipment well known in the art such is that described in U.S. Pat. No. 5,203,938, previously discussed.

FIG. 8 is a simplified, cross-sectional view of the general configuration of a pneumatic tire of the kind that employs the bead/apex subassembly 118 of the present invention. The tire 110 comprises an elastomeric carcass 130 with a carcass ply 132 reinforced with cords of various materials known to those skilled in the art. The cords extend in a generally radial direction or in a biased direction to form a radial ply tire or a biased ply tire according to standard design parameters. The tire includes a tread 134, a pair of sidewalls 136 and a reinforcing belt 138 reinforced with inextensible fibers or cords of fiberglass, steel, polyester or the like interposed between the carcass tire 130 and the tread 134. The radially inwardly extending edge portions of the carcass ply 132 wrap around the bead 120 forming turn-ups 140 ending in the area of the tire sidewall 136. Radially outward of each bead 120 and juxtaposed thereagainst is a bead apex filler assembly 118 constructed according to the teachings of the present invention. The tire 110 is mounted on a rim 150, a portion of which is shown in outline.

Although the invention has been described with particular reference to certain specific embodiments, it should be understood that other variations may be used without departing from the basic concept. For example different materials may be used in the construction of the cooling mandrel, the shaped stationary helix, or the rollers provided these components are capable of functioning in the same manner as those described herein. Any structural framework may be used for supporting either embodiment of the helix provided the framework is able to maintain radial spacing between the helix and the mandrel and is able to provide adequate support for the helix while several convolutions of the apex filler are passing therethrough. As the dimensions of the extruded apex filler are changed to accommodate beads of differing diameters, and tires having different specifications, it will become necessary to replace one helix former with another of different cross sectional profile and/or diameter, and to use a cooling mandrel having a diameter which fits the dimensional parameters as herein described. The mandrel may be cooled as described or may be heated for the purpose of achieving the results desired by the present invention.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

What is claimed is:

1. In a method of producing a pneumatic tire comprising a tire carcass, including a pair of annular beads, at least one flexible ply having side edges wrapped around the beads, a pair of sidewalls, the edges of the carcass ply forming turn-ups terminating radially above the beads, and an apex filler in contact with the outer periphery of each bead and extending radially outwardly therefrom between the carcass ply and the turn-up, the method comprising the steps of:

extruding the apex filler as an elastomeric extrusion having a generally triangular cross section and comprising a base and a pair of sides converging at a peak;

coiling the elastomeric strip into a spiral shaped coil having a triangular cross-sectional shape with a inner diameter ($D_c$) of the extrusion being smaller than the outer diameter ($D_B$) of the annular bead whereby the base of the extrusion is compressed and the peak of the extrusion is stretched;

unwinding the spiral shaped coil to increase the diameter of the coil; and wrapping the unwound spiral shaped coil with the increase in diameter around an outer diameter of the annular bead to form an apex filler/annular bead subassembly.

2. The method according to claim 1 wherein the apex filler is coiled into a spiral having an inner diameter ($D_c$) at least about 50% and less than about 75% of the outer diameter ($D_B$) of the annular bead to which the apex filler is to be applied.

3. The method according to claim 2 wherein the spiral shaped extruded coil is gradually cooled to set the shape of the coil.

4. A method of producing an apex filler comprising extruding an elastomeric compound through a die to form an extrusion having a triangular cross-section with a base and a pair of sides converging toward a peak, the method further comprising:

converting the linear movement of the extrusion as it comes from the die to helical motion as the extrusion enters an opening in a stationary apex former wrapped helically around an internally cooled rotating mandrel;

gradually cooling the extrusion upon the rotating mandrel, which has cooling water passages, as the extrusion moves within the stationary apex former while being wrapped helically upon the rotating mandrel, thereby forming the extrusion into a spiral having an inner diameter ($D_c$) between about 50% and about 75% of the outer diameter ($D_B$) of an annular bead to which a length of the extrusion is to be attached.

5. The method according to claim 4 including the step of applying the extrusion to the outer periphery of the bead to form the apex filler.

6. An apparatus for forming a triangular elastomeric extrusion for use as an apex filler in a filler/bead subassembly for a pneumatic tire, the apparatus comprising:

a) a rotating mandrel having a diameter ($D_m$) of between about 50% to about 75% of the outer diameter ($D_B$) of an annular bead to which the elastomeric extrusion is to be applied;

b) means for gradually cooling the extrusion upon the rotating mandrel having cooling water passages therein; and c) a stationary helical apex former for transferring the extrusion along the longitudinal axis of the rotating mandrel while maintaining the shape of the apex filler.

7. The apparatus according to claim 6, further characterized in that the mandrel is mounted in close proximity to the stationary helical apex former that surrounds the mandrel to shape the extrusion as the mandrel rotates.

8. The apparatus according to claim 7 wherein the stationary helical apex former is characterized by an open, axially inverted V-shaped form having an opening corresponding to the cross sectional shape of the extrusion.

9. The apparatus according to claim 8 wherein the interior surface of the stationary helical former is a low friction surface.

10. The apparatus according to claim 9 wherein the stationary helical former is characterized by a plurality of rollers extending in two rows along the helical path of the helical former.

11. The apparatus according to claim 10 wherein the plurality of rollers are aligned in a transverse relationship with the plane of the axis of the mandrel with the rollers in one row inclined toward the rollers in the other row to form an inverted V corresponding in shape and size to the cross-sectional shape of the extrusion.

12. The apparatus according to claim 7 wherein the helical former has a pitch of between about 0.3 cm and about 0.65 cm.

* * * * *